United States Patent [19]

Moore et al.

[11] 4,251,865
[45] Feb. 17, 1981

[54] POLLING SYSTEM FOR A DUPLEX COMMUNICATIONS LINK

[75] Inventors: Morris A. Moore; Robert H. Bass, both of Sunrise, Fla.

[73] Assignee: Motorola, Inc., Schaumburg, Ill.

[21] Appl. No.: 968,066

[22] Filed: Dec. 8, 1978

[51] Int. Cl.³ .............................. G06F 3/04; H04J 6/00; H04Q 5/00
[52] U.S. Cl. ..................................... 364/200; 370/96; 455/53
[58] Field of Search ... 364/200 MS File, 900 MS File; 179/15 AL, 15 BA; 340/147 R; 370/92, 93, 96; 455/38, 53

[56] References Cited

U.S. PATENT DOCUMENTS

| | | | |
|---|---|---|---|
| 3,582,896 | 6/1971 | Silber | 364/200 |
| 3,725,864 | 4/1973 | Clark et al. | 364/200 |
| 3,787,627 | 1/1974 | Abramson et al. | 179/15 BA |
| 3,790,717 | 2/1974 | Abramson et al. | 179/15 AL |
| 3,919,483 | 11/1975 | Gindi et al. | 364/200 |
| 4,047,162 | 9/1977 | Dorey et al. | 364/200 |
| 4,100,533 | 7/1978 | Napolitano et al. | 179/15 BA |
| 4,138,735 | 2/1979 | Allocca et al. | 364/900 |

Primary Examiner—Mark E. Nusbaum
Attorney, Agent, or Firm—Margaret Marsh Parker; James W. Gillman

[57] ABSTRACT

Channel efficiency in a communications link between a controller and multiple portable units is increased by polling the active units and a set number of inactive units in a sequence where a "poll" consists of sending the binary coded address of the portable unit. The stream of transmitted data bits is only interrupted by a response from the portable unit, then resumed at the end of the response or a given portion of the response. During the reception of the response, certain other types of messages can be sent out by the controller. Portable responses can be automatic responses as to status, etc., or can be data initiated by the operator of the portable unit keyboard and stored in the portable unit memory until "armed" by the operator, then automatically transmitted to the controller when the portable unit address is received.

9 Claims, 8 Drawing Figures

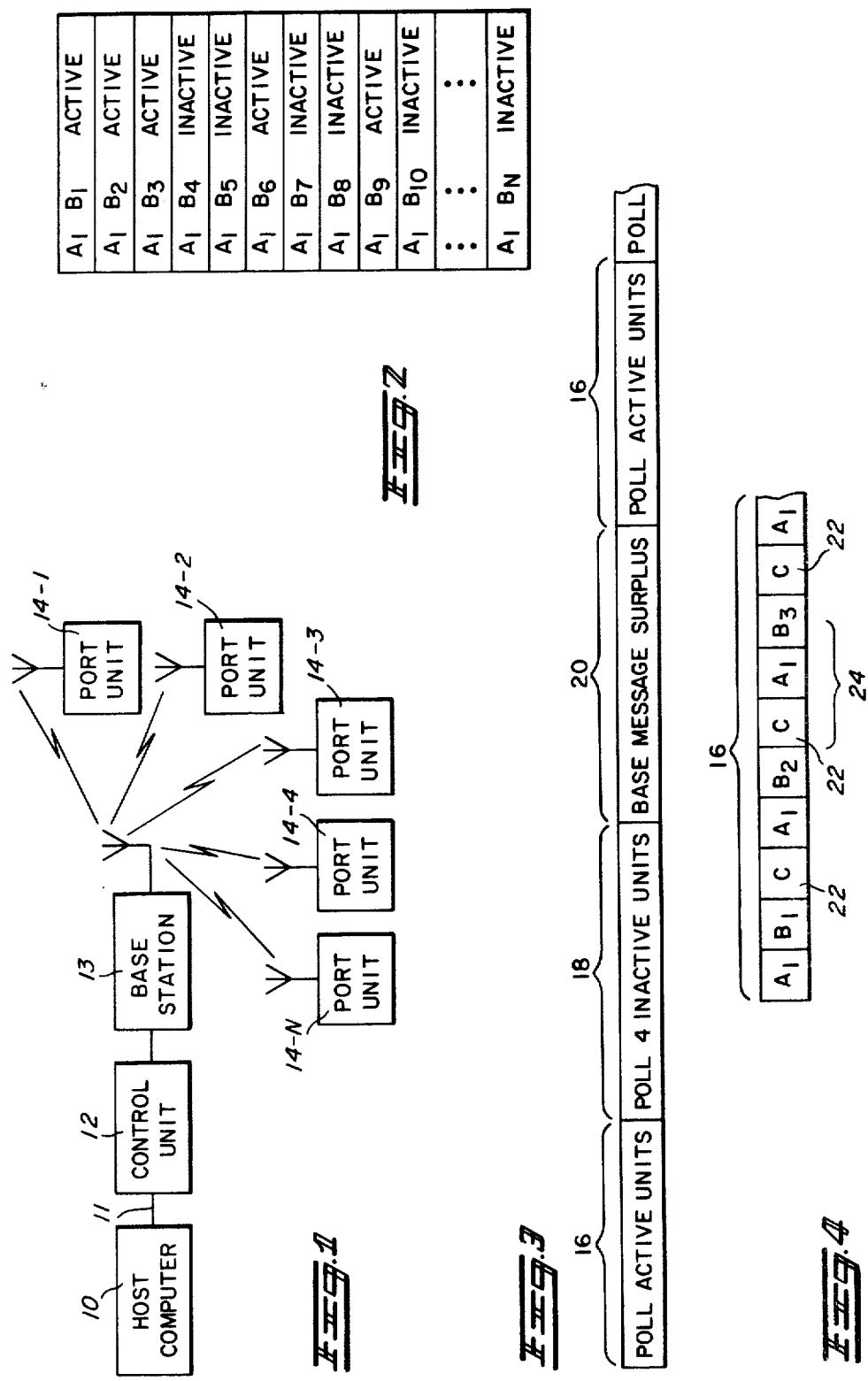

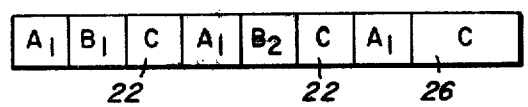
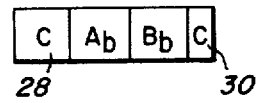
FIG. 5A  FIG. 5B
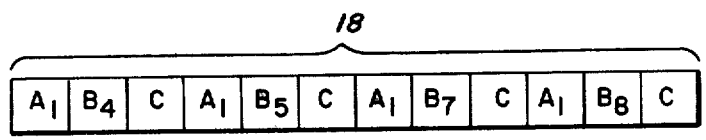
FIG. 6
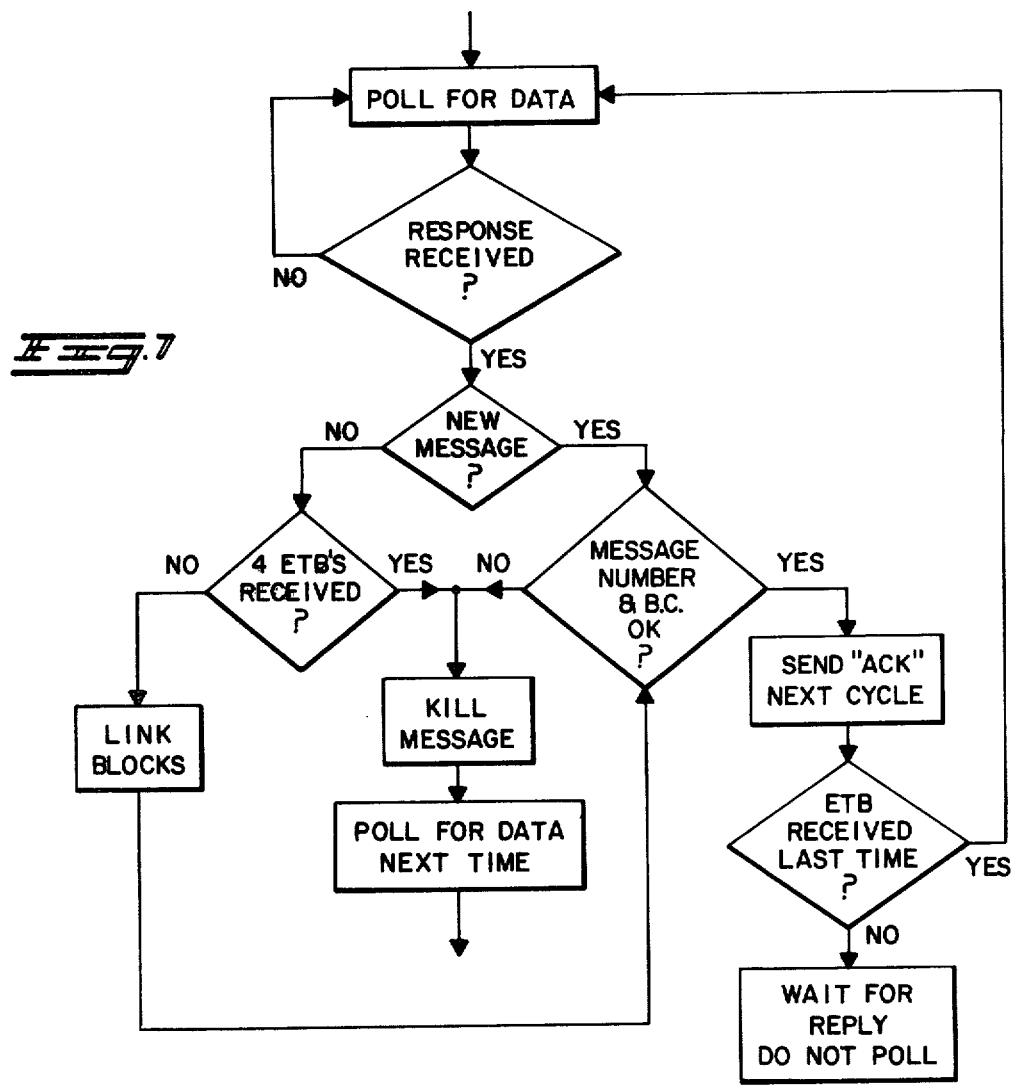
FIG. 7

POLLING SYSTEM FOR A DUPLEX COMMUNICATIONS LINK

BACKGROUND OF THE INVENTION

This invention relates generally to the field of duplex communications, and more particularly to systems wherein a master unit transmits to and receives from a multiplicity of subsidiary units over a single channel.

There are many types of systems wherein one master unit communicates with a number of subsidiary units utilizing a two-way flow of data over a single communication channel. There are paging systems using RF transmission wherein each unit has an assigned address and the master unit transmits a given address, encoded in some fashion such as a sequence of tones modulated onto a carrier as exemplified in U.S. Pat. No. 3,766,523, or as digital "words" in a bit stream as in in U.S. Pat. No. 3,855,576, both patents being assigned to the same assignee as is the present invention. The latter patent will be referred to again hereinbelow. In the former patent, the pager unit having the assigned address decodes it upon reception and in one of a number of ways alerts the pager user that he has been paged.

Another application requiring a two-way flow of data involves a large computer, a control unit and multiple satellite CRT terminals, all inter-connected by cables. Such a system might be used as on a production line where the assembled products; e.g., automobiles, may require special components for certain units going down the line. Information relative to each individual unit's requirements is stored in the master computer. An operator along the line can query the computer via one of the CRT terminals as to any special components. The computer, of course, will reply almost instantaneously, but the operator must then return to the production line, where the unit in question has been moving along. Such systems typically poll each CRT terminal in sequence, wait for an answer, and then move on at the end of the answer or after a set period such as three seconds.

Another system, used as in inventory applications, utilizes detached portable units including a data entry terminal and data storage means. The user enters inventory data as he or she moves along the aisles of a warehouse, by keyboard and/or light pen. Then, at the end of a given time period, perhaps several hours, the portable unit is brought to a master computer terminal and plugged in for transfer of the stored data into the master computer. It is obvious that in the two latter systems, a detached or completely portable two-way terminal in constant touch with the computer would be preferred, with some means for controlling the flow of data between the portable units and the master or host computer for maximum channel efficiency.

SUMMARY OF THE INVENTION

It is therefore an object of the present invention to provide a system for two-way communication between a multiplicity of portable units and a master computer.

It is a particular object to provide a system controller for interfacing with all of the elements of the system and which provides maximum efficiency in channel use.

These objects are partially achieved in a system described more fully in a co-pending application, Ser. No. 967,805, filed as of even date with the present invention. However, further increase in channel efficiency may be achieved in the last referenced system or other similar system by a unique arrangement for polling without time-wasting delays while waiting for responses from the various units.

In the present polling system, each portable unit is assigned a unique address code which has an assigned position in a queue of all the portable address codes in the RAM memory of the controller unit. Attached to each address code is a "tag" which indicates whether the portable unit is "active" or "inactive", "active" meaning that the unit is presently processing data or has been within a predetermined time period prior to being polled. In any one polling sequence, the controller polls in sequence each active unit, then polls a set number of inactive units. If any portable unit responds (with the address code assigned to the controller) within a time slot or window following reception of its own address code the controller aborts the address code then being sent out and sends out a comma or non-data bit signal. The controller also identifies the received message as being from the unit which responded. Following receipt of the message from that portable, the controller continues the polling sequence, beginning with the address code which had been aborted. Alternatively, following an interruption of the polling sequence, the controller may send a short comma, then transmit to other portable units any stored messages not requiring responses.

BRIEF DESCRIPTION OF THE DRAWING

FIG. 1 is a block diagram showing a complete system which could utilize the present invention.

FIG. 2 is a portion of the portable unit queue which is used in the description of the operation of the system.

FIG. 3 is a diagram indicating a portion of the controller transmission sequence.

FIG. 4 is an elaboration of one possible block of the chart of FIG. 3.

FIG. 5a is a different version of the elaboration of FIG. 4.

FIG. 5b is a chart of a possible response to the polling sequence.

FIG. 6 is an elaboration of a different block of the chart of FIG. 3.

FIG. 7 is a flowchart illustrating the operation of the controller unit in polling for data from the various portable units.

DETAILED DESCRIPTION OF A PREFERRED EMBODIMENT

FIG. 1 is an overall view of a total system which could utilize the polling system of the present invention. A host or master computer 10 is coupled by a link 11 to a control unit 12. The computer could be any one of a number of relatively large computers, an example being the IBM 360/370 series. The link 11 could be a short DC data link or a leased telephone line of almost any length with a modem at each end. Communication over this link will be explained only to the extent necessary for an understanding of the present polling system.

Many features of the control unit 12 are described more fully in the co-pending application Ser. No. 967,805 filed as of even date with the present invention and covering the entire system. However, all the information necessary for undertanding and practicing the present invention will be given herein.

The host computer 10 has the capacity to be coupled to as many as 32 control units 12 (one is shown). By means of a base station or FR transmitter/receiver 13, each control unit 12 may be coupled to as many as 32 portable units 14 (five are shown in FIG. 1.)

The present polling system is described in terms of the coupling of one control unit 12 and its portable units 14-1 to 14-n, where n is 32 in a preferred embodiment although the invention is not so limited. Also, in the preferred embodiment, the coupling is by way of a two-way radio link, but the invention is not limited thereto either.

In the usual application, the host computer 10 will initiate polling and receive responses in whatever protocol, language and baud rate it requires; i.e. Binary Synchronous Landline, Extended Binary Coded Decimal Interchange Code (EBCDIC) or American Standard Code for Information Interchange (ASCII), at transfer rates from 1200 to 9600 bits per second. The controller unit 12 will store all information received from the host computer 10 and convert it to the proper language and speed required by the portable units 14.

The control unit 12 then polls the portable units 14 in accordance with the polling sequence as described hereinafter, processes all return information and even, if desired, provides portable to portable communication.

The key to the polling sequence is the queue discipline of the control unit 12 which in this case assigns to each portable unit 14 a position in the queue which does not change; e.g., 14-1, 14-2, 14-3 etc. However, in contrast to the prior art, where every unit was queried in turn, with a pause as long as three seconds following each poll for possible response, the controller 12 "tags" each control unit address code in the RAM memory with an active or inactive status identification. These tags are continually updated.

A partial listing of a typical queue is represented in FIG. 2, including portable unit 14 address codes with status tags. This listing will be used hereinafter in the further explanation of polling, but is of course exemplary only. An "active" tag means that the respective portable unit is presently processing received data, is generating data (via keyboard or light pen), or has done so within a predetermined time period; e.g., 5 minutes. When no activity has occurred regarding a particular portable unit during the 5 minute timing interval, the address code of that unit is then tagged as "inactive".

FIG. 3 shows a portion of one particular polling sequence and including a block 16 which includes the address codes of all active units, a block 18 which includes a given number (4 in the present embodiment) of address codes of inactive units (the inactive units chosen will be discussed hereinbelow). Following the blocks 16 and 18 is a block 20 during which any stored data not requiring a response is sent out by the control unit 12. This block will also be discussed further hereinbelow. Then another polling sequence begins with another block 16. The diagram of FIG. 3 assumes that no units respond to the polling for data and that therefore there are not interruptions to the sequence.

It is to be noted here that, in the present embodiment, all portable units 14 have the same first address code word, and each word comprises 46 binary bits, but these limitations are not necessary for the present invention.

In FIG. 4 the beginning portion of block 16 is shown with the address code $A_1B_1$ for portable unit 14-1, followed by a comma is a 22. A comma transmission period of non-data signal which serves to separate various data signals, and in this example is a series of 17 1/0 bits at about 1200 Hz. The data transmission between control unit 12 and the portable unit 14 is, in the present instance, ASCII code at a rate of 1200 Baud. Following the first comma 22 is address code $A_1B_2$, another comma 22, address code $A_1B_3$, another comma 22, etc. Given the queue shown in FIG. 2, this sequence would continue with $A_1B_6$, comma 22, $A_1B_9$, and including all "actives" in the queue.

Since it will be assumed, in connection with FIG. 5, that portable unit 14-2 will have a resonse ready when polled, a window 24 has been indicated during which portable unit 14-2 must respond with the address code of the terminal. The window 24 ends well before the end of address code $A_1B_3$, allowing a safety margin in which a control unit 12 can interrupt the polling sequence before $A_1B_3$ is completely transmitted. When the address code $A_1B_3$ transmission is aborted, the control unit tags this address as the starting address of the next polling sequence. The control unit 12, upon recognizing its address code will begin transmitting a comma 26 of at least 48 bits, and thereafter any stored surplus base messages, otherwise comma will continue until the end of the transmission from portable unit 14-2 or a predetermined portion thereof as will be discussed hereinafter. This simultaneous transmission further increases channel utilization.

FIG. 5A shows the beginning portion of block 16' which is how block 16 would appear if portable unit 14-2 responds during the window 24. Here the sequence includes $A_1B_1$, comma 22, $A_1B_2$, comma 22, $A_1$, comma 26, and, possibly, data (not shown).

FIG. 5B shows the response which the portable unit 14-2 must make during window 24 (automatically, of course, since the window may be of the order of 75 milliseconds). The response will include a comma 28, $A_bB_b$ (the control unit 12 address code) and a 1-bit comma 30. It should be noted that many variations of address codes/comma formats are possible within the scope of the invention in addition to the ones embodies here.

Following the reception by the control unit 12 of the message or message portion from portable unit 14-2, the polling sequence will resume with address code $A_1B_3$ for portable unit 14-3 and continue as before.

FIG. 6 in an expansion of the block 18 of FIG. 3 and is also based on the queue discipline of FIG. 2. Thus, following the polling of all active units, a given number (in this instance, 4) of the inactive units is polled. It is here assumed that the last inactive unit polled in a previous sequence was the last inactive unit in the complete queue. Therefore, the polling sequence of block 18 is now $A_1B_4$, comma 22, $A_1B_5$, comma 22, $A_1B_7$, comma 22, $A_1B_8$, comma 22, unless one of these four portable units responds. In that case, the sequence is interrupted as before, then continued with the aborted address code. Following the sequence of block 18, block 20 follows with whatever surplus messages have been received and stored in the control unit 12. These are messages which do not require an immediate response from the portable unit involved.

Another polling sequence begins after block 18, or after block 20 if a block 20 is sent. If there had been no responses from any portable unit during the previous polling sequence, the next block 16 would begin with address code $A_1B_1$ unless portable unit 14-1 had by then been inactive for more than the 5 minute limit. In that case the first address code in block 16 would be $A_1B_2$ since it is an active unit.

In the description of FIG. 3 hereinabove, a mention was made that possibly only a portion of the $A_1B_2$ message might be transmitted. This would be the case if portable unit 14-2 was attempting to send a relatively long message. Each transmitted block of data, following the control unit address code, is limited to a predetermined number of bytes and if the message to be sent requires a larger number of bytes, the flow of data is cut off at the predetermined number and a signal is sent to signify that more data of the same message will be transmitted on the next sequence. A message number is included to avoid operating on the same message twice. A block check number is also included for a determination of accurate reception of the message.

During the next polling sequence portable unit 14-2 would again respond to its address code and interrupt the sequence with the control unit address and the second block of message data. If the message is concluded in the second block, a signal to that effect is transmitted to the control unit 12. If still more data remains in the portable unit 14-2 memory from the same message, the process will continue for a predetermined number of polling sequences, preferably four. Then, if the message includes more than four blocks of data, the control unit 12 assumes that there has been an error, wipes out all record of the message from the control unit memory, tags that portable unit "inactive" and polls for data again from that same portable unit during a subsequent "inactive" polling sequence.

The flow chart of FIG. 7 shows the sequence of steps in the polling for data sequence from control unit to portable unit. Polling is an invitation from the control unit to the portable unit to send data to the control unit, usually to be sent to the host computer. The first block "poll for data" indicates that the control unit is polling all portable data terminals in the sequence as described above. If no response is received to a particular address code, that code will be included in the next polling sequence unless, as described above, it is tagged "inactive" before the beginning of that sequence. If a response is received from a portable unit, the control unit determines whether this is a beginning of a new message or a continuation of a message begun on a previous polling sequence. If it is the beginning of a new message the control unit checks the message number and the block check number to be sure that the message has been received correctly. If not, the message is deleted from memory and the particular portable unit is tagged "inactive" and polled for data in the "inactive" polling sequence. If the message number and block check number are satisfactory the portable unit is so notified (ACK) on the next polling sequence. If the signal indicating that more data is waiting was detected, the message block is stored and labelled and the unit is polled for data on the next polling sequence. If a signal had been received indicating that the message was complete, the control unit would transmit the data to the host computer and while waiting for reply would not again poll that particular portable unit. Returning to the point in the chart where it was determined whether the message received was the beginning of a new message or a continuation of a previously begun message, and if the latter were the case, the next step in the control unit is to determine whether four such blocks of the same message had been received. If the answer is "no" the blocks are linked together in the control unit memory and the message number and block check characters examined as before and if the answer here is "yes" or "no" the same procedures apply as before. However, if four blocks have been received without the signal indicating that the complete signal has now been transmitted, the message is assumed to be in error and it is deleted from the control unit memory and that portable unit is polled for data on the next "inactive" polling sequence.

Thus there has been described and shown a system in accordance with the present invention wherein substantial improvement in channel efficiency is made in the two-way transmission of data between a control unit and a multiplicity of portable units. Part of the improvement derives from the fact that all so-called "inactive" units are not polled on each sequence, and part by the fact that no delays are required in order to listen for an answer since the system can abort the polling sequence at any point when the control unit address is received, switch to transmission of surplus base messages, and resume transmission of the polling sequence at the address code which was aborted. Safeguards are also included for preventing overly long messages which would typically be messages containing a serious transmission error, so that the system or even one portable unit is not blocked from further communication. The reader is also reminded that the embodiment shown is only one of many possible applications of the invention and that all applications, variations and modifications covered by the appended claims are included.

What is claimed is:

1. A method of providing more efficient use of a single communication channel of a controller/remote terminal unit link serving a multiplicity of terminal units, each unit having a permanent and unique address and comprising logic circuitry and memory, and comprising the following steps:

assigning to each said terminal unit address a permanent position in a queue of addresses stored in the memory of the controller;

the controller continuously tagging each terminal unit address in the queue as active or inactive, where "active" means that the unit is presently operating upon data or has been operating upon data within a predetermined period of time;

the controller transmitting all of the terminal unit addresses which are tagged as active units, omitting the addresses of all units tagged as inactive units, in a sequence determined by the queue of addresses;

the controller transmitting the addresses of a predetermined number of said inactive units, the choice of said units being determined by the queue of addresses;

the controller listening during said transmissions to both active and inactive units for the controller address to be received from any one terminal unit within a fixed time period following the transmission by the controller of the address of said one terminal unit, said fixed time period ending later than the beginning and earlier than the end of the next subsequent address in the transmitted sequence;

any one of the terminal units responding to said respective assigned address by transmitting the controller address followed by a data message;

the controller recognizing that reception of the controller address during said fixed time period is a response from that terminal unit having the address immediately preceding the address being transmitted at the time of controller address detection;

upon such reception, the controller interrupting the sequence of said address transmissions, storing the received predetermined message and any immediately subsequent data from the responding terminal unit;

the controller processing said predetermined message; and the controller resuming transmission of the sequence of messages, beginning with the address which was previously interrupted.

2. The method in accordance with claim 1 wherein said addresses are binary coded addresses.

3. The method in accordance with claim 2 wherein each said binary coded address consists of at least two digital words, and one of said words is unique in the system.

4. The method in accordance with claim 1 wherein the transmission and reception of addresses and responses is done via an RF link.

5. The method in accordance with claim 1 and further including the step of retransmitting by the controller, on a second transmission link, of at least some of the received responses from terminal units.

6. The method in accordance with claim 1 and further including the step of inserting non-data signals between each succeeding pair of addresses in each sequence.

7. The method in accordance with claim 1 wherein the step of processing the received predetermined message includes the steps of:

checking said message for completeness and accuracy; and checking to see if the number of incomplete messages sequentially received from one terminal unit exceeds a predetermined number.

8. The method in accordance with claim 7 and including, if said number of received incomplete messages exceeds said predetermined number, the controller erasing the message and tagging the transmitting portable unit as inactive.

9. The method in accordance with claim 7 and including, if said number of received messages does not exceed said predetermined number, the controller storing the messages and the controller retransmitting the messages on a second transmission link.

* * * * *

UNITED STATES PATENT AND TRADEMARK OFFICE
CERTIFICATE OF CORRECTION

PATENT NO. : 4,251,865
DATED : February 17, 1981
INVENTOR(S) : Morris A. Moore & Robert H. Bass It is certified that error appears in the above—identified patent and that said Letters Patent is hereby corrected as shown below:

Column 2, line 64, delete "undertanding" and insert --understanding--.

Column 2, line 68, delete "FR" and insert --RF--.

Column 3, line 57, delete "not" and insert --no--.

Column 3, line 64, after "comma" (first occurrence), delete "is a", and after "comma" (second occurrence), insert --is a--.

Column 4, line 8, delete "resonse" and insert --response--.

Column 4, line 37, delete "embodies" and insert --embodied--.

Signed and Sealed this

Twenty-sixth Day of May 1981

[SEAL]

Attest:

RENE D. TEGTMEYER

Attesting Officer     Acting Commissioner of Patents and Trademarks